(12) United States Patent
Schenk et al.

(10) Patent No.: US 10,260,661 B2
(45) Date of Patent: Apr. 16, 2019

(54) LINE ELEMENT HAVING AN INNER ELEMENT AND AN OUTER ELEMENT

(71) Applicant: Westfalia Metallschlauchtechnik GmbH & Co. KG, Hilchenbach (DE)

(72) Inventors: Karsten Schenk, Schwalmstadt (DE); Oliver Selter, Attendorn (DE); Matthias Weiss, Hilchenbach (DE); Stefan Hauk, Hilchenbach (DE); Dietmar Baumhoff, Olpe (DE); Karl-Heinz Münker, Hilchenbach (DE); Michael Henkelmann, Hilchenbach (DE); Andreas Gerhard, Wenden (DE)

(73) Assignee: WESTFALIA METALLSCHLAUCHTECHNIK GMBH & CO. KG, Hilchenbach (DE)

( * ) Notice: Subject to any disclaimer, the term of this patent is extended or adjusted under 35 U.S.C. 154(b) by 0 days.

(21) Appl. No.: 15/748,517

(22) PCT Filed: Jun. 8, 2016

(86) PCT No.: PCT/EP2016/063012
§ 371 (c)(1),
(2) Date: Jan. 29, 2018

(87) PCT Pub. No.: WO2017/016728
PCT Pub. Date: Feb. 2, 2017

(65) Prior Publication Data
US 2018/0224028 A1    Aug. 9, 2018

(30) Foreign Application Priority Data

Jul. 30, 2015  (DE) .................... 10 2015 112 535
Mar. 16, 2016  (DE) .................... 10 2016 104 885

(51) Int. Cl.
*F16L 11/20*   (2006.01)
*F16L 27/111*  (2006.01)
(Continued)

(52) U.S. Cl.
CPC ............ *F16L 11/20* (2013.01); *B21C 37/123* (2013.01); *B32B 1/08* (2013.01); *B32B 3/14* (2013.01);
(Continued)

(58) Field of Classification Search
CPC ........ F16L 11/20; F16L 11/16; F16L 27/1004; F16L 27/111; F16L 51/025; F16L 55/041;
(Continued)

(56) References Cited

U.S. PATENT DOCUMENTS 5,901,754 A * 5/1999 Elsasser .............. F01N 13/1816
                                                    138/118
6,062,268 A * 5/2000 Elsasser .............. F01N 13/1816
                                                    138/109
(Continued)

FOREIGN PATENT DOCUMENTS

DE   40 42 291     7/1992
DE   195 31 796    4/1997
(Continued)

OTHER PUBLICATIONS

International Search Report issued by the European Patent Office in International Application PCT/EP2016/063012 dated Sep. 23, 2016.
(Continued)

*Primary Examiner* — Craig Schneider
*Assistant Examiner* — David Deal
(74) *Attorney, Agent, or Firm* — Henry M. Feiereisen LLC (57) ABSTRACT

The invention relates to line elements (600) consisting of a multi-layer inner element (IE) and an outer element (AE), wherein the inner element (IE) and the outer element (AE) are in contact with each other at points, at lines, over part of the surfaces thereof, or over the full surfaces thereof. Furthermore, a frictional contact protection means extending (Continued)

over the component length is provided, or a frictional layer (121) is provided in the contact region of the inner element (IE) and the outer element (AE). The wear of the outer element (AE) caused by friction can thereby be minimized.

11 Claims, 6 Drawing Sheets

(51) Int. Cl.
| | |
|---|---|
| *F16L 51/02* | (2006.01) |
| *F01N 13/18* | (2010.01) |
| *F16L 11/15* | (2006.01) |
| *F16L 11/16* | (2006.01) |
| *F16L 27/10* | (2006.01) |
| *F16L 27/11* | (2006.01) |
| *F16L 55/04* | (2006.01) |
| *B32B 7/04* | (2019.01) |
| *B32B 1/08* | (2006.01) |
| *B32B 3/14* | (2006.01) |
| *B32B 3/18* | (2006.01) |
| *B21C 37/12* | (2006.01) |
| *F16J 3/04* | (2006.01) |

(52) U.S. Cl.
CPC ............... *B32B 3/18* (2013.01); *B32B 7/045* (2013.01); *F01N 13/1816* (2013.01); *F16L 11/15* (2013.01); *F16L 11/16* (2013.01); *F16L 27/1004* (2013.01); *F16L 27/11* (2013.01); *F16L 27/111* (2013.01); *F16L 51/025* (2013.01); *F16L 51/026* (2013.01); *F16L 51/027* (2013.01); *F16L 55/041* (2013.01); *B32B 2255/00* (2013.01); *B32B 2307/546* (2013.01); *F01N 2260/16* (2013.01); *F01N 2470/12* (2013.01); *F16J 3/047* (2013.01)

(58) Field of Classification Search
CPC . B32B 1/08; B32B 2307/546; F01N 13/1816; F01N 2470/12
USPC .......................................... 138/121, 114, 110
See application file for complete search history.

(56) References Cited

U.S. PATENT DOCUMENTS

| | | | | |
|---|---|---|---|---|
| 6,125,889 | A * | 10/2000 | Elsasser | F01N 13/1816 138/118 |
| 6,220,023 | B1 | 4/2001 | Ezzeddini et al. | |
| 6,427,727 | B1 * | 8/2002 | Thomas | F16L 11/16 138/106 |
| 6,848,478 | B2 * | 2/2005 | Nagai | F01N 13/1816 138/112 |
| 7,066,495 | B2 * | 6/2006 | Thomas | F01N 13/1816 285/226 |
| 7,571,745 | B2 | 8/2009 | Baumhoff et al. | |
| 7,650,912 | B2 * | 1/2010 | Kim | F01N 13/1816 138/121 |
| 7,748,749 | B2 | 7/2010 | Baumhoff et al. | |
| 8,844,579 | B2 * | 9/2014 | Eguchi | F01N 13/1816 138/121 |
| 2003/0159745 | A1 | 8/2003 | Espinasse | |
| 2008/0012297 | A1 * | 1/2008 | Heil | F01N 13/1816 285/226 |
| 2008/0041482 | A1 | 2/2008 | Baumhoff et al. | |
| 2008/0245435 | A1 * | 10/2008 | Weiss | F16L 11/16 138/135 |
| 2008/0264509 | A1 | 10/2008 | Weiss et al. | |
| 2010/0007138 | A1 | 1/2010 | Weiss et al. | |
| 2012/0056414 | A1 * | 3/2012 | Thomas | F01N 13/143 285/49 |
| 2012/0125192 | A1 | 5/2012 | Weiss et al. | |

FOREIGN PATENT DOCUMENTS

| | | |
|---|---|---|
| DE | 196 41 963 | 10/1997 |
| DE | 199 24 476 | 12/1999 |
| DE | 199 13 562 | 9/2000 |
| DE | 102005052204 | 6/2007 |
| DE | 102008001297 | 10/2008 |
| DE | 102011053131 | 5/2012 |
| DE | 102012013946 | 1/2014 |
| DE | 102013104446 | 10/2014 |
| DE | 102013105891 | 12/2014 |
| DE | 202015104177 | 1/2016 |
| DE | 102016102258 | 8/2016 |
| EP | 0 436 772 | 7/1991 |

OTHER PUBLICATIONS

Weiss et al., U.S. Pat. No. 8,181,672, May 22, 2012, 2008/0264509, Oct. 30, 2008.
Weiss et al., U.S. Pat. No. 8,453,680, Jan. 4, 2013, 2011/0209790, Sep. 1, 2011.
Weiss et al., U.S. Pat. No. 8,973,618, Mar. 10, 2015, 2011-0232796, Sep. 29, 2011.
Weiss et al., U.S. Pat. No. 9,291,263, Mar. 22, 2016, 2012-0125192, May 24, 2012.

* cited by examiner

Fig. 9

LINE ELEMENT HAVING AN INNER ELEMENT AND AN OUTER ELEMENT

CROSS-REFERENCES TO RELATED APPLICATIONS

This application is the U.S. National Stage of International Application No. PCT/EP2016/063012, filed Jun. 8, 2016, which designated the United States and has been published as International Publication No. WO 2017/016728 and which claims the priority of German Patent Application, Serial No. 10 2015 112 535.8, filed Jul. 30, 2015, and German Patent Application, Serial No. 10 2016 104 885.2 filed Mar. 16, 2016, pursuant to 35 U.S.C. 119(a)-(d).

BACKGROUND OF THE INVENTION

The invention relates to a line element composed of an inner and outer element. Such line elements are preferably installed in exhaust pipes in motor vehicles and flexibly connect individual, rigid line units with each other.

In the exhaust system of motor vehicles, vibrations are always produced, which are mostly caused by imbalances of rotating elements in the engine, turbo or ancillary units. Furthermore, vibrations are excited by the pulse-shaped pressure curves of the internal combustion engine. In addition to these higher-frequency vibrations, frequencies in the single-digit and lower two-digit Hertz range can be excited by the driving movements in conjunction with road bumps and their feedback into the chassis.

The line elements described above have the task of decoupling such vibrations and movements in the exhaust system of motor vehicles. In addition, they compensate for possible installation tolerances.

In the case of flexible line elements which are insufficiently damped, the vibrations induced in the exhaust system during operation cause excitation of natural frequencies, which when severe have a service-life-reducing effect on the flexible line element. Their vibration behavior is characterized by their masses and spring stiffness. In the case of metal bellows with corrugations formed symmetrically with respect to the rotation axis, the natural modes associated with the small natural frequencies are frequently standing longitudinal waves in the bellows structure, with the number of oscillation nodes increasing with the order of the natural frequency. The amplitude of these natural frequencies decreases with decreasing rigidity. Therefore, the natural frequencies of such components generally decrease with increasing diameter and length. Especially in the commercial vehicle sector, where the diameters and lengths of the flexible line elements are larger due to the system design, the use of metal bellows without a damping system adapted to the specific configuration is not promising.

Flexible line elements therefore have damping units which when, subjected to vibrational loads, preferably operate on the basis of frictional contact. In this case, metal mesh or metal braids are primarily used.

The patent DE 196 41 963 C1 discloses a damped line element, which includes in the exterior region as well as in the interior region a metal braid that is in contact with the turns of the line element over the entire component length. In this case, the contact area between the line element and metal mesh extends in the radial direction in a completely enclosing manner.

Line elements attenuated by an outer metal mesh are known from the published patent applications DE 199 24 476 A1, DE 40 42 291 A1 and DE 10 2005 052 204 A1, wherein a portion of the turns is in frictional engagement with the mesh for producing the damping, while other turns are positively or non-positively connected specifically with the mesh. The outer contact region extending over the entire component length is completely encircling in the radial direction. The line elements with damping known from the prior art have the disadvantage that, to provide the damping function, additional components must always be installed in the line element, which represents an increase in weight and material.

Furthermore, DE 199 13 562 A1 discloses a flexible hose composed of an outer bellows and a metal hose arranged therein, which are in contact with one another for the purpose of damping vibrations.

SUMMARY OF THE INVENTION

To realize a lightweight construction, it is an object of the invention to provide a structure of a flexible and damped line element, without significant increasing weight and material resulting from additionally installed damping elements. At the same time, the line element should operate reliably and have a long service life.

This object is attained with line elements according to claim 1 or 2. Advantageous embodiments of these line elements are recited in the dependent claims.

A line element according to the invention is composed of an inner element and an outer element which are in contact with each other at points, along a line, over part of an area or over the entire area. The damping function is hereby fulfilled not separately by damping elements, but is instead integrated in the inner or outer element.

In the line element according to the invention, the inner element is arranged coaxially in the outer element.

According to a first embodiment, the line element is characterized in that the inner element is composed of a flexible strip-wound hose constructed from one or more tape strips, and the line element (or its inner element and/or outer element) has a frictional contact protection extending over the component length (i.e., the axial length of the line element).

The "frictional contact protection" serves to minimize wear caused by the friction between the inner element and the outer element. In particular, it can prevent or at least reduce the removal of the material of the outer element in the contact region. This can be achieved for example by a suitable material selection and/or material treatment of the contacting layers of inner element and outer element.

Optionally, conditioning of one or both surfaces (inner element, outer element) may be used. For example, conditioning of the contacting layers of one of the two friction partners may be based on thermal or thermochemical diffusion methods and surface coating methods. Exemplary but inclusive methods are:

carburizing,
kolsterising,
(plasma, gas, salt bath) nitriding,
nitrocarburizing,
carbonitizing,
flame hardening,
induction hardening,
laser hardening,
plasma hardening,
chemical nickel plating,
hard chrome plating,
thermal spraying,
build-up welding of hard or soft coatings,
chemical vapor deposition (CVD),
physical vapor deposition (PVD),
ion implantation,
and/or laser treatment methods.

According to a second embodiment, the line element is characterized in that the inner element has a multilayer structure, wherein one of the layers in the contact region between inner element and outer element forms a friction layer. The friction layer can be formed, for example, as a coating or with friction-optimized material selection. In particular, one of two layers of the line element can function as a support layer while the second layer can form the friction layer (wear carrier layer).

The line element according to the invention in accordance with the two described embodiments has the advantage that damping can be attained without the use of additional components due to the contact between the inner element and the outer element, whereby damage to the outer element can be prevented by the frictional contact protection or the friction layer. This provides the line element with high reliability and long service life.

The multilayer structure of the inner element can optionally be produced by a tape strip, which is composed of several positively or non-positively connected layers and is wound into a strip-wound hose. The tape strip may, for example, have a core of a hard material which is at least locally coated with another (softer) material and/or whose surface has been treated at least locally.

Alternatively, the multilayer construction of the inner element is attained with a flexible strip-wound hose constructed of a plurality of tape strips. In this case, two or more tape strips (typically having the same width) are superposed and fed together as a package to the forming and winding processes for the production of a strip-wound hose. However, this does not usually produce a positive connection of the tape strips.

According to the above description, the friction layer may be formed, for example, by a surface coating of the inner element, conditioning of the surface of the inner element, and/or by one of several tape strips.

The material of the friction layer is preferably selected for optimizing friction. In other words, with respect to the wear (in particular of the outer element), the friction between the friction layer and the outer element in the contact area would be superior to the friction between two identical materials employed for the friction layer and the outer element. In particular, the friction layer may be softer than the material of the outer element (as measured, for example, by the methods HR or HV according to Rockwell and Vickers, respectively), so that the friction layer and not the outer element is removed by the frictional contact.

The friction layer and/or the frictional contact protection and/or a tape strip may preferably contain or consist of at least one of the following materials:
stainless steel,
steel,
zinc,
zinc phosphate,
aluminum alloys,
copper,
titanium,
tantalum,
nickel-based alloys,
graphite,
aramids (e.g. Kevlar®),
brass,
bronze
and/or molybdenum sulfide.

Various embodiments of strip-wound hoses, wound bellows, corrugated bellows or rotationally symmetric or helical corrugated bellows welded in the upper profile area may be used as an inner element or outer element. The outer element may preferably be composed of a corrugated bellows, a membrane bellows structure or a wound bellows structure, which have either corrugations that are perpendicular to the axis of rotation or spiral corrugations. A wound bellows structure may preferably be non-positively hooked together or welded in an overlapping or positive manner.

Furthermore, the outer element may be composed or consist of at least one of the following materials:
stainless steel,
steel,
zinc,
aluminum alloys,
copper,
titanium,
tantalum,
nickel-based alloys,
brass,
and/or bronze.

The material surfaces of the outer element and the inner element that come into contact in the contact area are preferably selected in a coordinated manner in order to reduce or minimize frictional wear. In particular, the material of the inner element in question may be selected to be softer than that of the outer element.

According to a further embodiment of the invention, the inner element and/or the outer element may have a non-circular cross section at least in an axial segment of the line element. In particular, it may have a polygonal cross-section with typically rounded corners. Furthermore, a non-circular inner/outer element may usually be combined with a round outer/inner element. The non-circularity makes it easy to create a pointwise contact, contact along a line or over an area.

Furthermore, the inner hose preferably abuts at least in an axial portion of the line element the inner wall of the outer hose under tension (i.e., with a compressive force). This ensures that contact between the inner hose and the outer hose is maintained even when the hoses move. Furthermore, the damping behavior may be influenced by the magnitude of the tension.

Further information relating to line elements with non-circular inner or outer hoses is disclosed in DE 10 2015 102 258 and DE 10 2012 013 946 A1, which are incorporated by reference in their entirety in the present application.

Further information relating to line elements with a coaxial arrangement of an inner and an outer hose is disclosed in DE 20 2015 104 177 U1, which is incorporated by reference in its entirety in the present application.

BRIEF DESCRIPTION OF THE DRAWING

In the following, the invention will be explained in more detail by way of example with the reference to the figures. These show in.

DETAILED DESCRIPTION OF PREFERRED EMBODIMENTS

Figure 1:
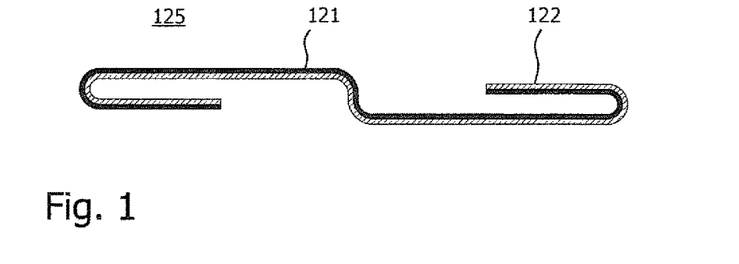
FIG. 1 a cross section through the two-layer tape strip of an inner element according to the invention.
Figure 2:
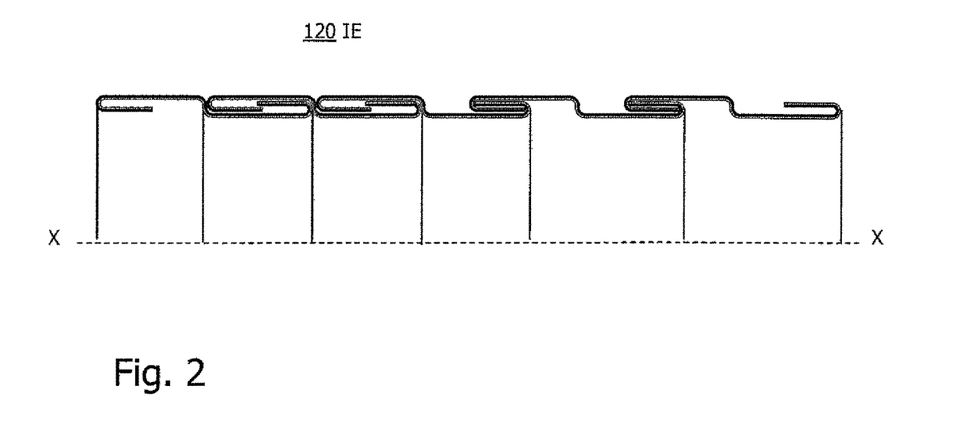
FIG. 2 a cross-section through the wall of an inner element, which is wound from the tape strip of FIG. 1.

FIG. 1 shows a cross section through a two-layer tape strip 125, from which the strip-wound hose 120 shown in FIG. 2 is produced by winding and interlocking. FIG. 2 shows a cross-section through the wall of the hose, which should be visualized as being rotationally symmetric about the hose axis X-X.

The two-layer tape strip 125 is composed of two parallel individual tape strips 121 and 122. During the manufacturing process, these individual tape strips 121 and 122 are arranged one above the other and processed together, i.e. contoured and wound. This produces a form-fitting (but generally non-positive) connection between the strip strips 121 and 122.

Figure 3:
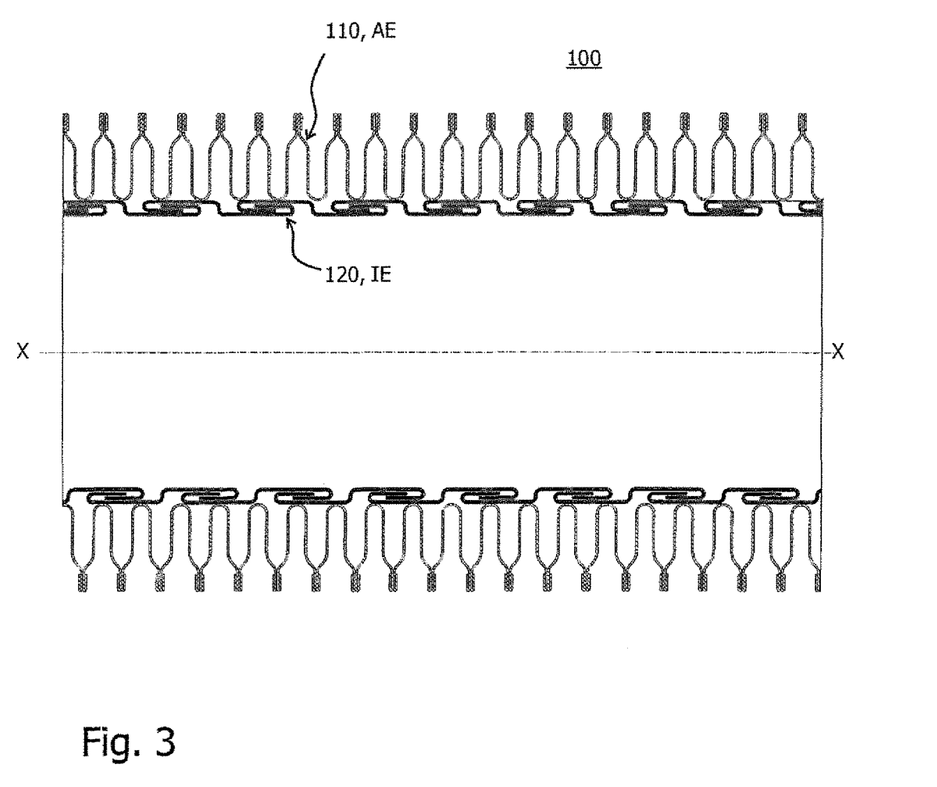
FIG. 3 a cross section through a line element, which has an inner element according to FIG. 2 and an outer element in the form of a rotationally symmetrical or helically corrugated membrane bellows that is welded in the upper profile region.

FIG. 3 shows a line element 100 according to the invention, which is formed from the strip-wound hose 120 as an inner element (also denoted by "IE" in the figures) and an outer element 110 (also denoted by "AE" in the figures). In the illustrated example, the outer element AE is a rotationally symmetrical or helically corrugated diaphragm bellows 110 welded in the upper profile region. As illustrated, the outer surface of the inner element IE contacts the inner surface of the outer element AE (at least in the illustrated sectional plane). Due to the contact between inner element IE and outer element AE, an effective vibration damping of line element 100 is achieved. Preferably, the contact takes place under a certain bias.

In the strip-wound hose 120, the tape strip 121 is located at the radially outermost position and exclusively forms the outer surface of the strip-wound hose in the compressed state. Therefore, only this tape strip 121 in the line element 100 comes into contact as a "friction layer" with the outer element AE. According to the invention, this tape strip 121 is selected in a friction-optimized manner with respect to the outer element AE. In particular, this friction-optimized selection can be made so that the outer element AE experiences the least possible wear caused the friction between inner element IE and outer element AE during operation of the line element 100. The material of the tape strip 121 (or at least its surface layer, if it is not composed of a uniform material) is therefore normally chosen to be softer than the material of the outer element AE. The material of the inner element IE is then primarily removed by friction. The tape strip 121 thus forms a frictional contact protection between inner element IE and outer element AE.

A desired or required stability can be imparted on the strip-wound hose 120 by an appropriate selection of the second, inner tape strip 122. This inner tape strip 122 may in particular be composed of a hard material or may have a hardened surface produced by thermal diffusion processes.

Exemplary, but not exhaustive typical material combinations are listed below.

| outer tape strip 121 | inner tape strip 122 |
| --- | --- |
| stainless steel 1.4016 | stainless steel 1.4828 |
| stainless steel 1.4016 | nickel-based alloys |
| brass alloys | stainless steel 1.4828 |
| brass alloys | nickel-based alloys |
| aluminum | stainless steel 1.4301 |
| aluminum | nickel-based alloys |
| graphite | stainless steel 1.4301 |
| graphite | nickel-based alloys |

Both the inner element IE and the outer element AE may in the simplest case have a circular cross section (perpendicular to the hose axis). The contact between the elements then takes place over an area.

In preferred embodiments, however, the inner element IE or the outer element AE has a non-circular cross section (while the respective other element of the line element has a circular cross section). In this case, there is usually only a line-shaped or possibly even only a single-point contact. In a particularly preferred embodiment, the inner element IE has a non-circular and the outer element AE has a circular cross-section.

Figure 4:
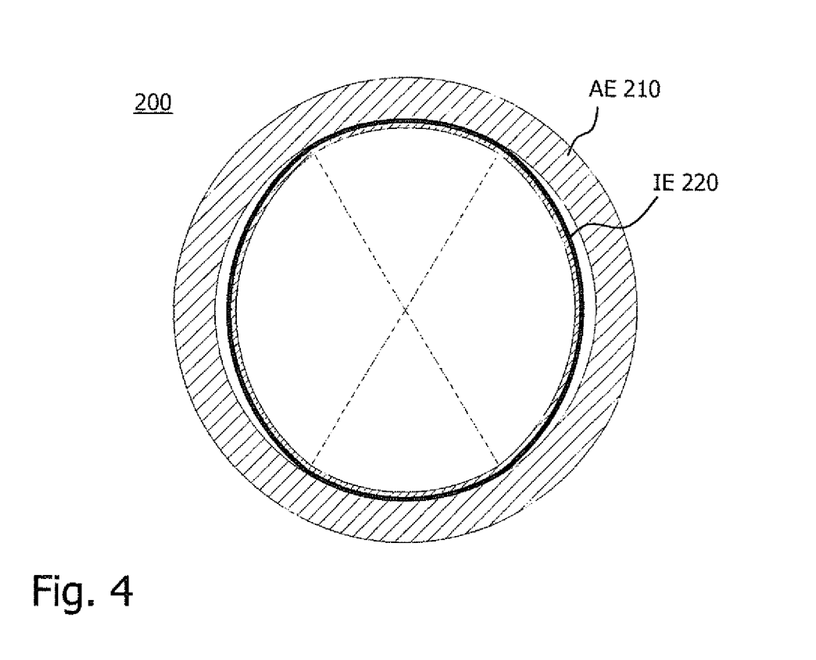
FIG. 4 in a front view, a line element with an oval inner element.

In FIG. 4 shows in this context a front view of a line element 200 having an oval inner element 220 and a circular outer element 210. Frictional contact occurs between axially extending lines spaced by 180°.

Figure 5:
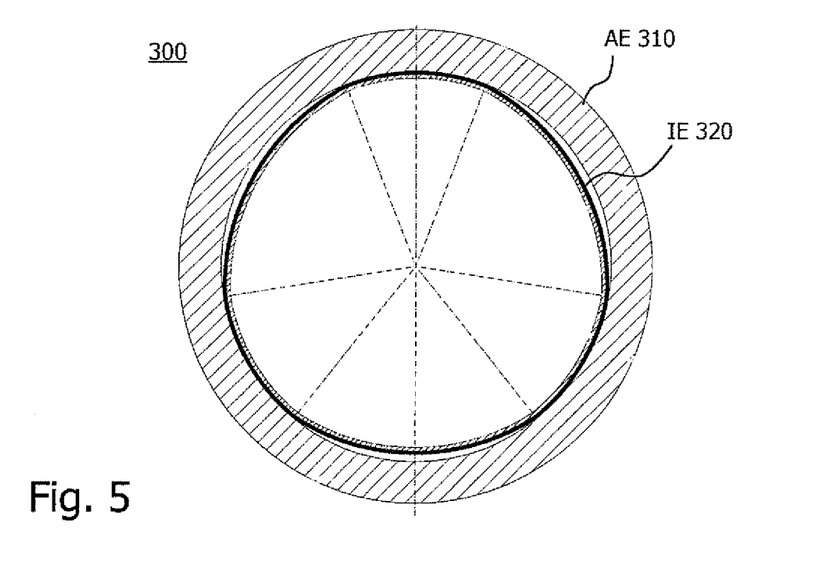
FIG. 5 in a front view, a line element with a trigonal inner element.

FIG. 5 shows a front view of a line element 300 with a triangular (trigonal) inner element 320 and a circular outer element 310. Frictional contact occurs between axially extending lines spaced by 120°.

Figure 6:
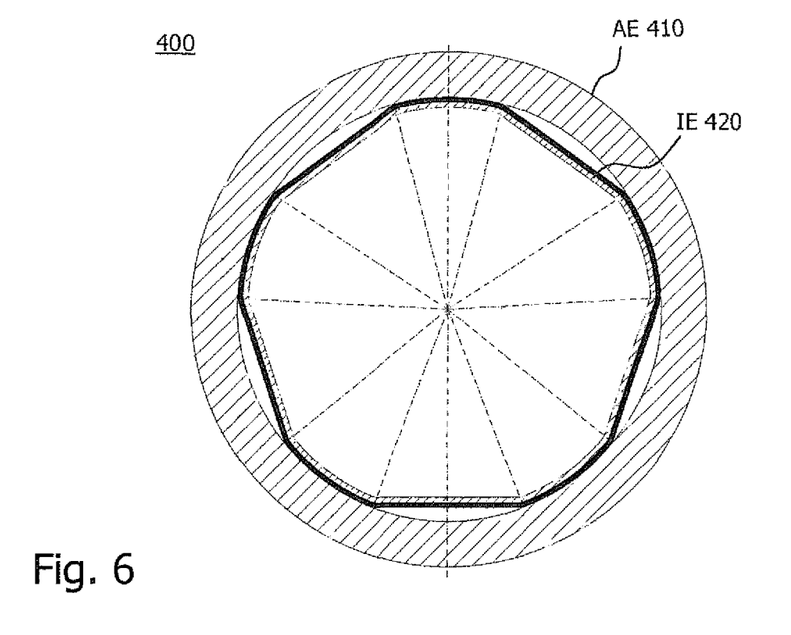
FIG. 6 in a front view, a line element with a pentagonal inner element.

FIG. 6 shows a front view of a line element 400 with a pentagonal inner element 420 and a circular outer element 410. Frictional contact occurs between axially extending lines spaced by 72°.

Figure 7:
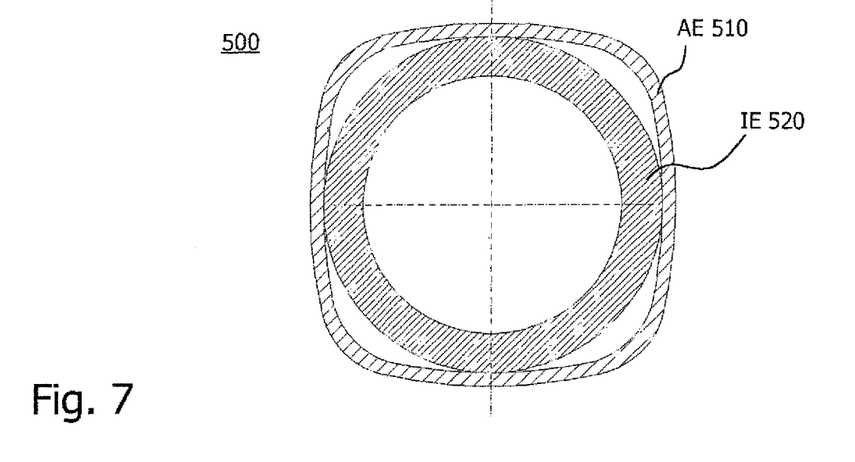
FIG. 7 in a front view, a line element with a tetragonal outer element and a round inner element, which is in direct frictional contact with the outer element in at least one radial region.

FIG. 7 shows a front view of a line element 500 with a tetragonal outer element 510 and a circular inner element 520. Frictional contact takes place between axially extending lines spaced by 90°.

Figure 8:
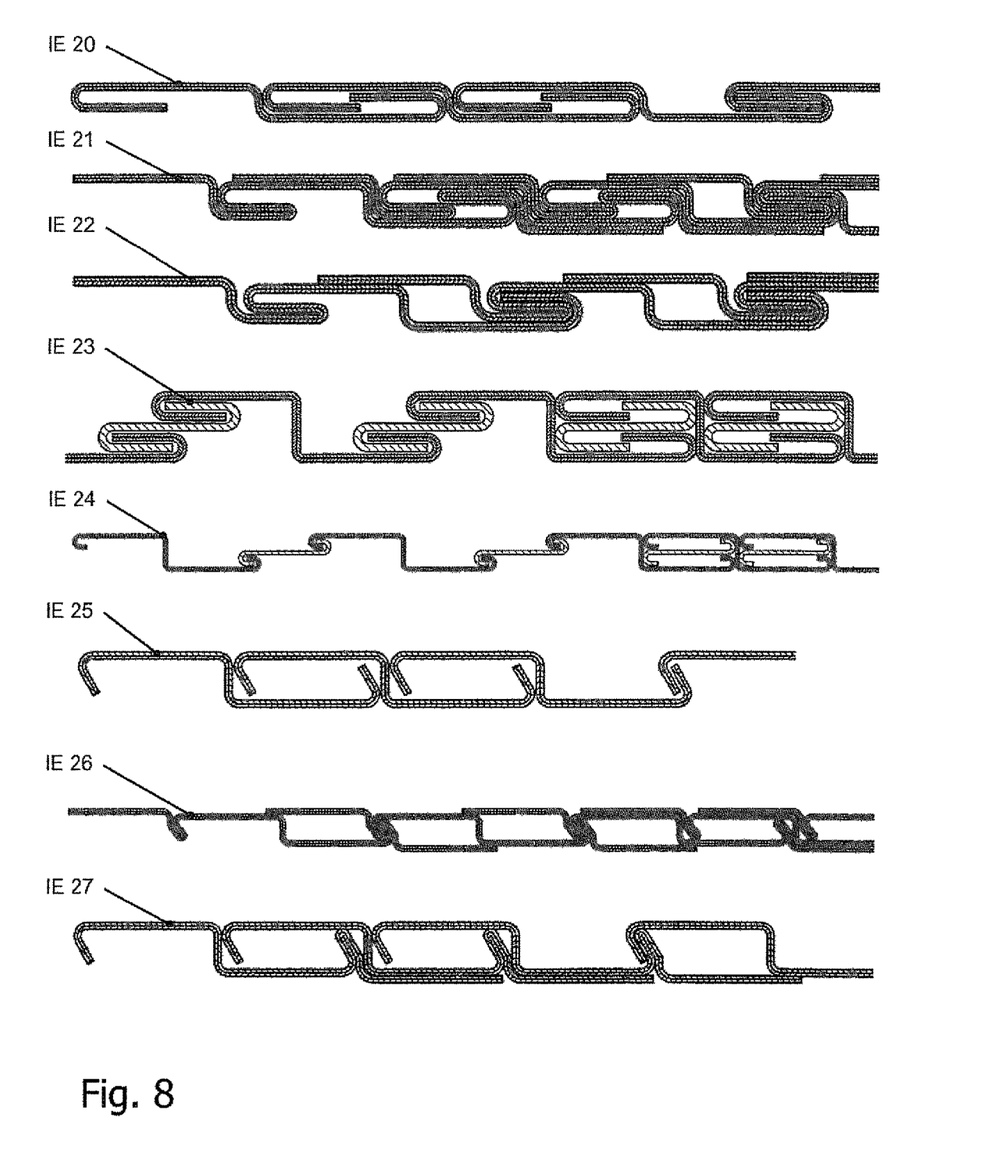
FIG. 8 in a sectional view, possible but not exhaustive embodiments of multi-layer strip-wound hoses, which may find application as an inner element or as an outer element.

FIG. 8 shows a sectional view of possible, but not exhaustive embodiments of multilayer strip-wound hoses 20-27, which may be used as inner element IE (or outer element). In particular, in all the line elements 100-600 illustrated in the figures, the inner element IE may be formed by one of the strip-wound hoses 20-27. Illustrated by way of example are a multilayer, interlocking strip-wound hose 20,
 a multilayer double-joint strip-wound hose (DSS) 21,
 a multi-layered joint strip-wound hose (SSS) 22,
 a multilayer, interlocking strip-wound hose with preferably 60 percent elongation 23,
 a multilayer, interlocking strip-wound hose with preferably 100 percent elongation 24,
 a multilayer, hooked, interlocking strip-wound hose 25
 a multilayer, hooked double-joint strip-wound hose with preferably 60 percent elongation 26,
 a multi-layered, hooked joint strip-wound hose 27.

Figure 9:
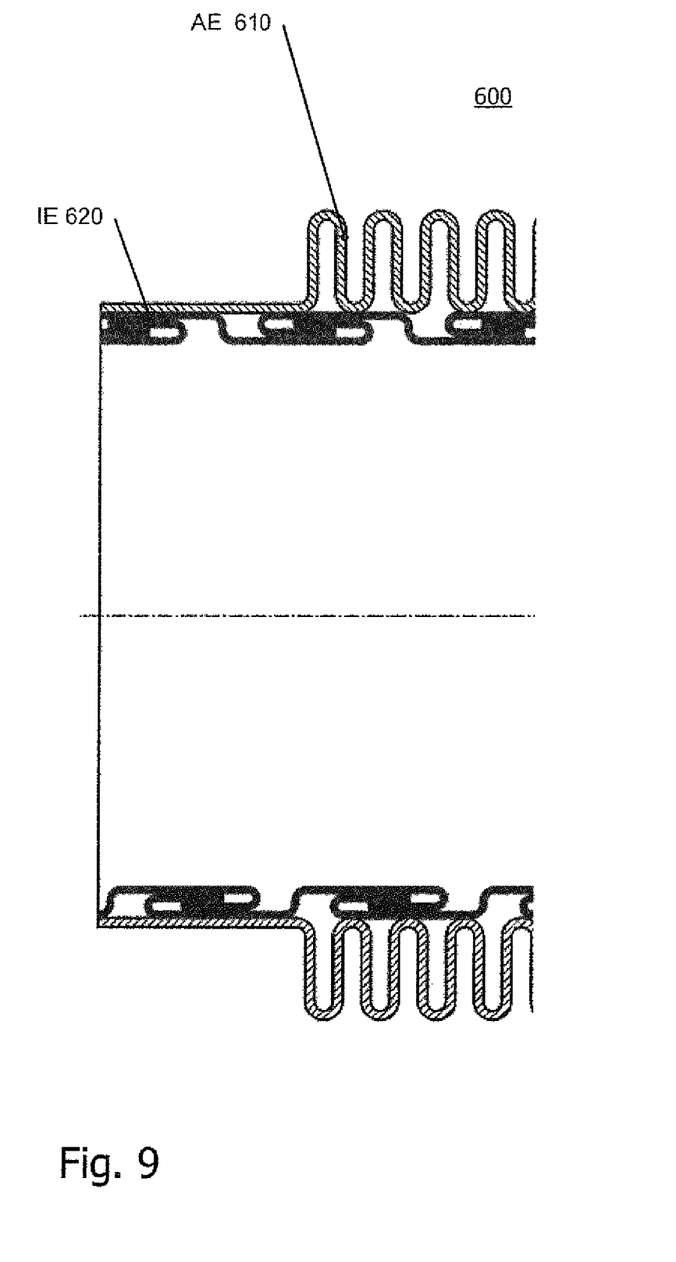
FIG. 9 a cross section through a line element, wherein the inner element is a multi-layer, clasp-shaped strip-wound hose with preferably 30 percent elongation and the outer element consists of a bellows.

FIG. 9 shows a cross section through a line element 600, wherein the inner element IE is a multilayer, interlocking strip-wound hose 620 with preferably 30 percent elongation, while the outer element AE consists of a corrugated bellows 610.

The outer element AE in all of the line elements 100-600 illustrated in the figures can optionally be formed by a helical bellow, a corrugated bellows or a rotationally symmetric helically corrugated diaphragm bellows welded in the upper profile region. Examples of such outer elements AE can be found in DE 102008001297 A1, DE 102011053131 A1, and DE 102013104446 A1.

The invention claimed is:

1. A line element comprising:
   an inner element composed of a flexible strip-wound hose made of a plurality of tape strips, with the tape strips having a multilayer construction with an inner layer and an outer layer which is superposed on the inner layer across a full surface area of the tape strips,
   an outer element composed of a corrugated bellows, a diaphragm bellows structure or a wound bellows structure having either corrugations formed perpendicular to the axis of rotation or spiral corrugations, wherein the outer element surrounds the inner element and contacts the inner element in a contact region at points, along a line, across a partial area or across a full area,
   wherein the outer layer of the inner element comprises a friction-reducing material that is softer than a material of the outer element at least in the contact region.

2. The line element of claim 1, wherein the friction-reducing material comprises at least one material selected from stainless steel, steel, zinc, zinc phosphate, aluminum, aluminum alloys, copper, titanium, tantalum, ceramics, nickel, nickel-based alloys, graphite, aramids, brass, bronze and molybdenum sulfide.

3. The line element of claim 1, wherein the outer element comprises at least one material selected from stainless steel, steel, zinc, aluminum, aluminum alloys, nickel-based alloy, copper, titanium, brass, bronze and tantalum.

4. The line element of claim 1, wherein a surface of the outer element is at least locally conditioned.

5. The line element of claim 4, wherein conditioning comprises a thermal or thermochemical diffusion process or surface coating process.

6. The line element of claim 1, wherein a surface of the outer layer of the inner element is at least locally conditioned.

7. The line element of claim 6, wherein conditioning comprises a thermal or thermochemical diffusion process or surface coating process.

8. The line element of claim 1, wherein at least one axial segment of the inner element or the outer element line element, or both, has a non-circular cross section.

9. The line element of claim 8, wherein the non-circular cross section is a polygonal cross section.

10. The line element of claim 1, wherein the inner layer and the outer layer of the inner element are positively or non-positively connected across the full surface area.

11. The line element of claim 1, wherein the inner layer and the outer layer of the inner element are superposed without forming a positive connection between the inner and outer layer.

* * * * *